No. 898,092. PATENTED SEPT. 8, 1908.
A. CARRIER.
LEVEL AND COMPASS.
APPLICATION FILED JULY 25, 1907.
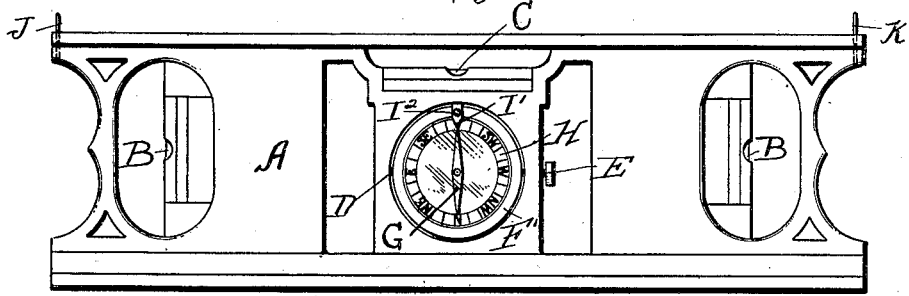
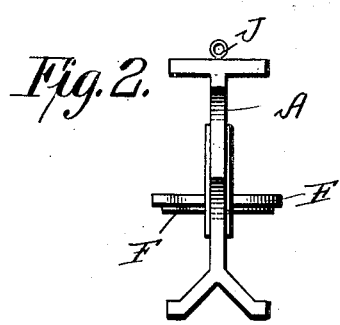
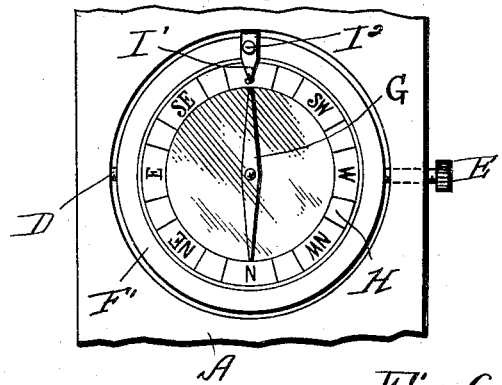
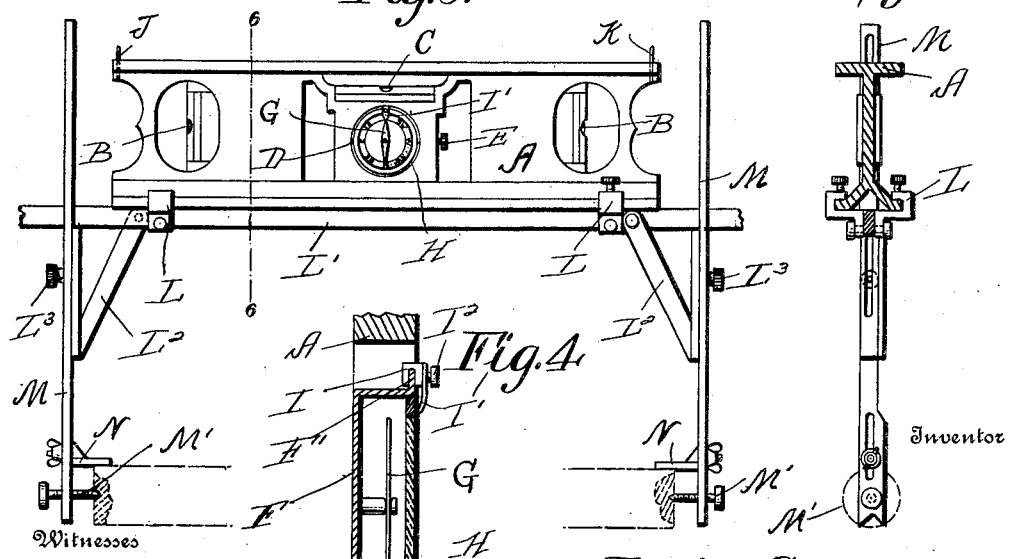
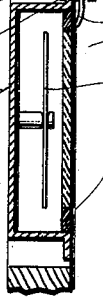
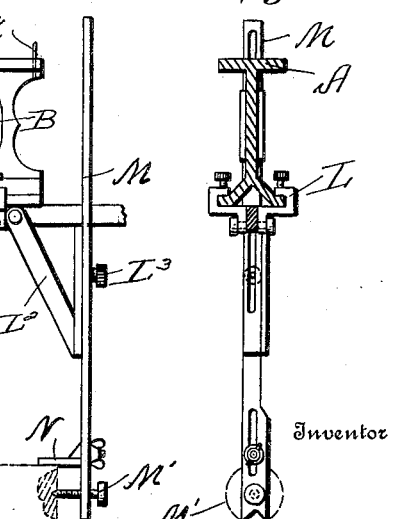

UNITED STATES PATENT OFFICE.

ADELOR CARRIER, OF ALABASTER, MICHIGAN.

LEVEL AND COMPASS.

No. 898,092.

Specification of Letters Patent.

Patented Sept. 8, 1908.

Application filed July 25, 1907. Serial No. 385,495.

*To all whom it may concern:*

Be it known that I, ADELOR CARRIER, a citizen of the United States, residing at Alabaster, in the county of Iosco and State of Michigan, have invented a new and useful Improvement in a Level and Compass, of which the following is a specification.

This invention relates to a level and compass, the object being to provide a device which is especially adapted for alining and leveling shafts of all kinds.

Another object of my invention is to provide a device which can be used for surveying foundations of small houses and the like.

Another object of my invention is to provide the instrument with adjustable legs so that shafts with pulleys and motor-shafts can be readily leveled.

Another object of my invention is to provide very novel means for adjusting the compass so as to hold the same in a horizontal position when using the instrument for surveying.

Still another object of my invention is to provide a compass with an adjustable needle adapted to be set with the compass needle, so as to tell exactly the direction the shaft runs, in order that a shaft on another floor can be put in perfect parallel alinement with the same.

With these objects in view, the invention consists in the novel features of construction, combination and arrangement of parts, hereinafter fully described and pointed out in the claims.

In the drawing forming a part of this specification:—Figure 1 is a side view of my improved instrument. Fig. 2 is an end view of an instrument, showing the compass swung into a horizontal position. Fig. 3 is a plan view of the compass and a portion of the stock. Fig. 4 is a transverse sectional view through Fig. 3. Fig. 5 is a side view of my improved instrument, the legs being attached and arranged on the shaft to be leveled. Fig. 6 is a section taken on line 6—6 of Fig. 5.

Referring to the drawing A indicates a stock preferably formed of metal having flanged upper and lower leveling edges, and provided with openings adjacent each end, in which are secured spirit vials B. An opening is formed centrally in the stock adjacent one leveling edge in which is secured a spirit vial C. The stock is provided with a circular opening under the vial C, in which is pivotally mounted on the pin D and setscrew E a compass case F provided with a central stud carrying a compass needle G, the case being inclosed by a glass and a dial ring H divided into suitable sub-divisions to indicate degrees and portions of degrees, and also provided with spaces to designate the different points of a compass and sub-divisions. The case is flanged as shown at F' on which is mounted a grooved block I carrying a needle I', and provided with a set-screw I² for locking the block on the flange of the compass in alinement with the compass point, so that the direction of a shaft can be readily determined as will hereinafter be fully described.

It will be seen that by loosening the thumb-screw holding the compass case, it can be swung down into a horizontal position as shown at Fig. 2 for using the device as a surveying instrument. A rear-sight J is mounted in the flange of the stock at one end and a front-sight K is mounted in the flange of the stock at the other end, so that the stock can be sighted so as to bring it into true alinement with the compass point, or any degree of the compass dial.

Secured on the lower flange of the stock, adjacent each end by set-screws, are guide-blocks L carried by a bar L' provided with brackets L² carrying set screws L³ on which are slidably mounted slotted legs M having threaded bores formed adjacent their lower ends, in which are mounted set-screws M' adapted to fit into the recess of a shaft. Slots are formed in the legs, above the board, in which are slidably mounted bolts carried by clamping blocks N which are secured in place by wing-nuts working on the bolt, the clamping blocks being adapted to rest on the upper portion of the shaft so as to securely hold the legs in place on the same. Notches are formed in the lower ends of the legs, so that the legs can be readily placed on a shaft when leveling a shaft provided with a pulley.

The operation of the device for alining shafts is as follows:—The grooved leveling edge of the stock is placed up against one of the shafts and held there until the compass needle has turned until it points direct north, the needle carried by the block is then adjusted on the flange to register with the compass needle, thus marking the number of degrees the shaft lies off from direct north. It is then removed and carried to the other shaft which is adapted to be alined with the same which may be in any other part of the building, and the grooved edge placed up against the same and the shaft moved until the compass point registers with the needle, thereby bringing the two shafts in direct alinement with each other.

From the foregoing description it will be readily seen that I have provided a very novel leveling and alinement instrument, which is exceedingly simple and cheap in construction and one which is very useful in use for truing and alining shafts of all kinds.

Having thus fully described my invention, what I claim as new and desire to secure by Letters Patent is:—

1. In a device of the kind described, the combination with a stock provided with spirit vials, of a compass adjustably mounted in said stock, adjustable legs carried by said stock and set screws working in the lower ends of said legs, for attaching said legs to a shaft.

2. In a device of the kind described, the combination with a stock having vertical vials adjacent each end, and a central horizontal vial, of a bar secured to one edge of said stock provided with brackets, legs adjustably mounted on said brackets, and means carried by said legs for securing said legs on a shaft, for the purpose described.

3. A device of the kind described comprising a stock, a pivotally mounted compass carried thereby, a needle adapted to be brought into alinement with the compass needle, legs supporting the stock, screws carried by said legs to engage ends of a shaft, and blocks carried by and adjustable on the legs to engage the sides of the shaft.

4. In a device of the kind described, the combination with a stock carrying a pivotally mounted compass, a bar, blocks carried by the bar, means for securing said blocks to the stock, brackets carried by the bar, supporting legs carried by said brackets, and means carried by said legs for engaging opposite end portions of a shaft.

ADELOR CARRIER.

Witnesses:
 CHARLIE KANE,
 JOHN ARMSTRONG.